United States Patent [19]

Compton

[11] 4,118,985
[45] Oct. 10, 1978

[54] RADIATION PYROMETERS

[75] Inventor: William A. Compton, San Diego, Calif.

[73] Assignee: International Harvester Company, Chicago, Ill.

[21] Appl. No.: 746,243

[22] Filed: Nov. 30, 1976

Related U.S. Application Data

[60] Division of Ser. No. 501,988, Aug. 30, 1974, Pat. No. 4,037,473, which is a continuation of Ser. No. 181,157, Sep. 16, 1971, abandoned.

[51] Int. Cl.² ............................................. G01J 5/04
[52] U.S. Cl. ........................................ 73/346; 73/351; 73/355 R
[58] Field of Search .................... 73/346, 351, 355 R, 73/355 EM

[56] References Cited

U.S. PATENT DOCUMENTS

| 3,310,356 | 3/1967 | Borberg | 73/355 R |
| 3,448,283 | 6/1969 | Higley et al. | 250/226 |
| 3,472,497 | 10/1969 | Preszler | 73/351 |
| 3,584,509 | 6/1971 | Compton et al. | 73/346 |
| 3,696,678 | 10/1972 | Mossey | 73/346 |

OTHER PUBLICATIONS

"Bristol-Velotron Radiation Pyrometer", The Bristol Company Bulletin, p. 1299 - Sep. 1965.

Primary Examiner—James J. Gill
Attorney, Agent, or Firm—Strauch, Nolan, Neale, Nies & Kurz

[57] ABSTRACT

Temperature measuring apparatus of the photometric type having a fiber optics device for conducting radiation to a signal producing detector. Provision is made for a purging fluid at the opposite end of the fiber optics device to keep foreign matter from accumulating.

2 Claims, 6 Drawing Figures

RADIATION PYROMETERS

This application is a division of application Ser. No. 501,988 filed Aug. 30, 1974 (now U.S. Pat. No. 4,037,473 issued July 26, 1977). The latter is a continuation of application Ser. No. 181,157 filed Sept. 16, 1971 (now abandoned).

This invention relates to temperature measurement and, more particularly, to novel, improved temperature measuring apparatus and to novel, improved methods of measuring temperature.

The novel apparatus and methods of the present invention are of particular value in the measurement of gas turbine blade or bucket temperatures. The principles of the present invention will accordingly by developed primarily by relating them to this application of the invention. However, it is to be understood that the foregoing is but an exemplary application of the novel apparatus and methods described herein and that the ensuing descriptions and discussions are accordingly not intended to limit the scope of the invention.

The greatest promise for increased performance of gas turbine engines lies in the use of higher turbine inlet temperatures in conjunction with compressors having higher pressure ratios since an increase of only 50° F. in the turbine inlet temperature can produce a major increase in the operating efficiency of a turbine engine. However, precise control of turbine blade or bucket temperatures is critical in such engines because, if a typical turbine bucket is operated at a temperature exceeding its maximum rated temperature by as little as 25° F., the useful life of the bucket may be decreased by as much as 50 percent. Therefore, if advantage is to be taken of the efficiency increase obtainable by operation at optimum temperature, precise control of gas inlet and bucket temperatures is essential.

At the present time bucket temperatures are indirectly controlled by thermocouple measurement of the gas leaving the turbine. The thermocouple method does not permit optimum bucket temperatures to be utilized since it has a slow response time and is relatively inaccurate so that a wide safety margin must be maintained. This is because thermocouples are insensitive to small temperature changes and because of temperature streaking; i.e., different portions of the gas stream will impinge on the turbine buckets at different temperatures.

The drawbacks of indirect bucket temperature measurement are well known, and proposals have accordingly heretofore been advanced for measuring bucket temperatures directly in turbine engines. One advanced temperature measuring system of this type is disclosed in U.S. Pat. No. 3,584,509 issued June 15, 1971, for TEMPERATURE MEASURING APPARATUS AND METHODS, which is intended to be incorporated by reference herein.

The temperature measuring apparatus disclosed in U.S. Pat. No. 3,584,509 includes a gas collimator through which radiant energy emitted from a target area of a body subjected to temperature measurement passes to a photovoltaic detector which generates an electrical signal proportional to the intensity of the radiant energy falling on it. This signal is indicative of the temperature of the body from which the energy is emitted as the intensity of radiant energy emitted from a body is proportional to its temperature. The detector-generated signal is preferably converted to one which has a magnitude proportional to the true temperature of the heated body and which can accordingly be utilized directly to control the flow of fuel to a turbine engine and/or converted to a digital signal to provide a temperature reading, for example.

One important and primary object of the present invention resides in the provision of novel devices for measuring temperature which are an improvement over those disclosed in U.S. Pat. No. 3,584,509.

A related and important primary object of the invention resides in the provision of novel, improved methods for measuring the temperature of heated bodies.

Primary objects of the invention have been identified above. Other important but more specific objects of the invention include the provision of novel, improved apparatus for measuring temperature:

(1) which are characterized by simplicity, ruggedness, compactness, accuracy, and fast response time;

(2) which have novel improved devices for providing an interface along the optical path between the body subjected to temperature measurement and the detector used to generate a signal indicative of the temperature of the body;

(3) which have a long service life;

(4) which are readily serviced;

(5) which are comparatively inexpensive;

(6) which have various combinations of the foregoing attributes.

Other important objects and advantages and further novel features of the present invention will become apparent from the foregoing, from the appended claims and as the ensuing detailed description and discussion proceeds in conjunction with the accompanying drawing, in which:

Figure 1:
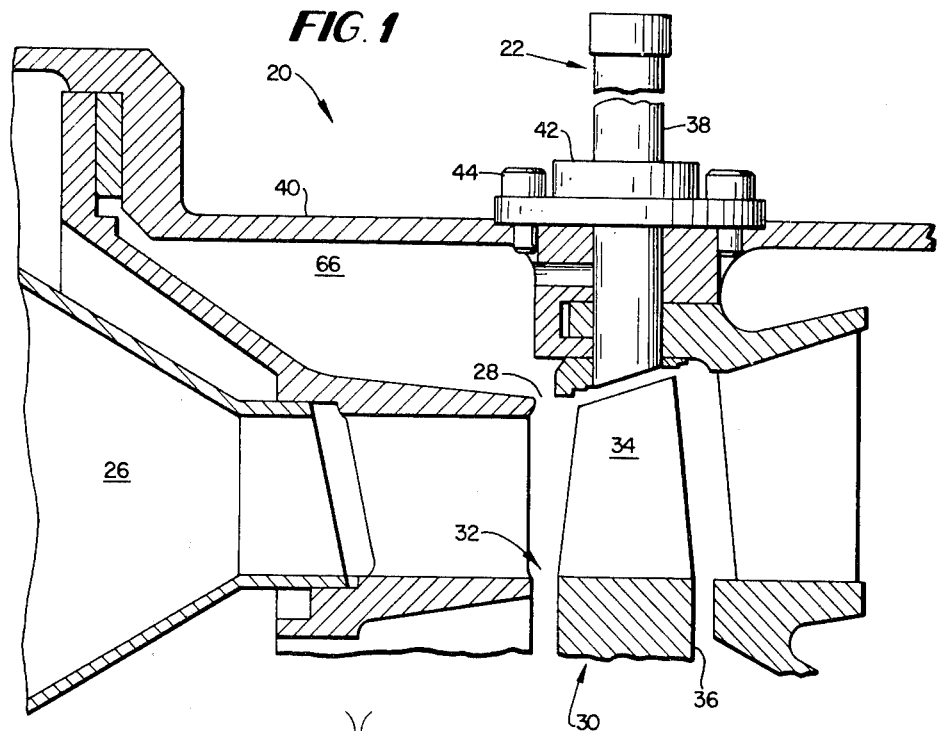
FIG. 1 is a fragmentary side view, largely in section, of a gas turbine equipped with temperature measuring apparatus constructed in accord with and in part embodying the principles of the present invention.
Figure 3:
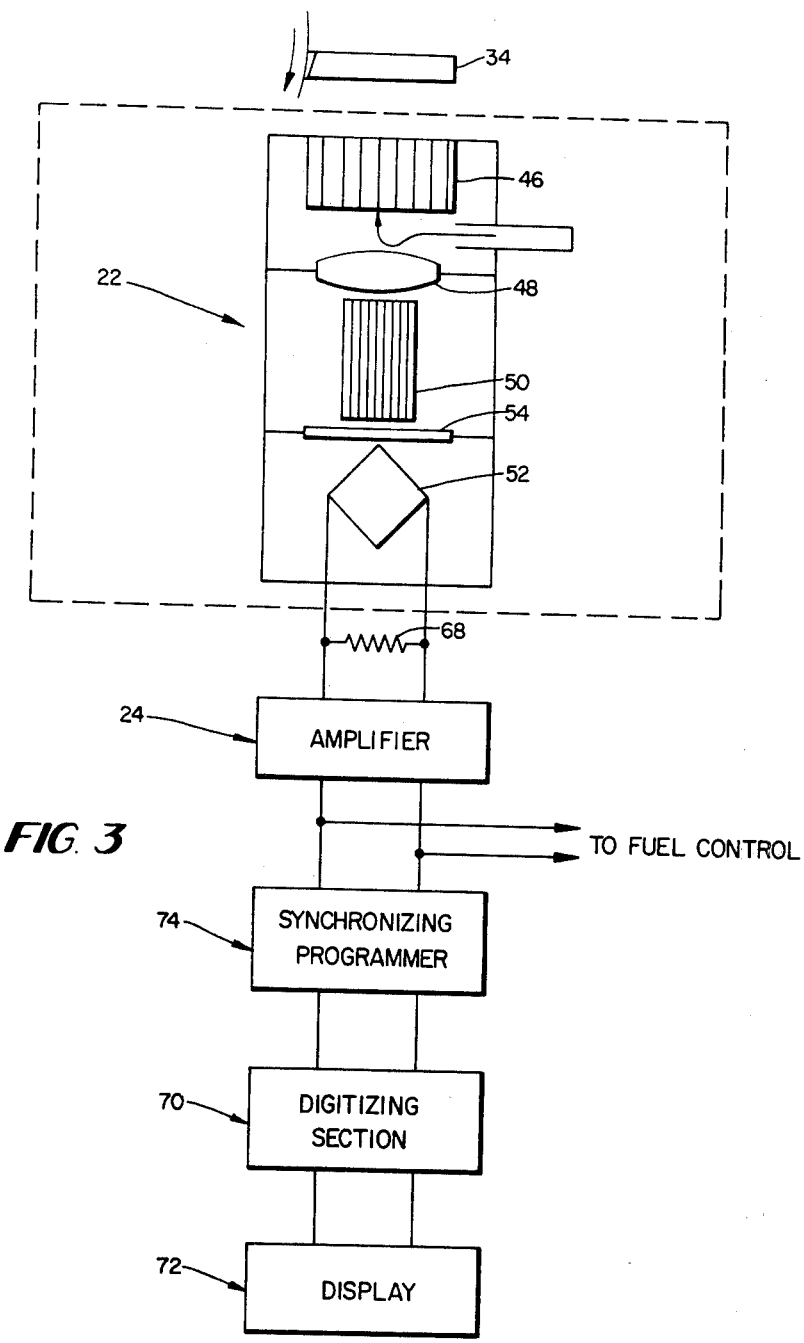
FIG. 3 is a diagrammatic illustration of a system for utilizing a temperature indicative signal generated by the apparatus of FIG. 1.

Referring now to the drawing, FIG. 1 illustrates a gas turbine engine 20 equipped with temperature measuring apparatus 22 constructed in accord with and embodying certain features of the principles of the present invention. Apparatus 22 produces an electrical signal having a magnitude proportional to the brightness temperature of the monitored engine components; and, in a typical application, this signal is amplified and converted by an analog amplifier 24 (see FIG. 3) to a signal proportional to the true temperature of the monitored components. As shown in FIG. 3, the amplified converted signal can be utilized to regulate the flow of fuel to turbine engine 20 and thereby control the temperature of the monitored components and can also be utilized to provide digital temperature readings.

Turbine engine 20, which is shown in only fragmentary form in FIG. 1, will typically include a compressor section (not shown) from which compressed air flows into a combustion section 26 where fuel is mixed with the compressed air and ignited to heat the air. From the combustion section, the hot compressed air and combustion products flow through inlet 28 into a turbine 30 which includes a wheel 32 consisting of a plurality of turbine blades or buckets 34 fastened to a rotatably mounted shaft 36.

As the hot fluid impinges on the turbine buckets, it rotates the shaft 36 of wheel 32 which is connected to the turbine engine compressor and may also be connected to load equipment such as a generator, propeller, or the like and, in most applications, to auxiliary equipment. Alternatively, the turbine may be employed only to drive the compressor and auxiliary equipment and the hot exhaust gases after passing through turbine 20 directed through an appropriately configured nozzle section to increase their velocity energy and thereby produce thrust capable of propelling an aircraft or other vehicle (an afterburner section is typically positioned ahead of the nozzle section to produce increased thrust).

Gas turbine engines of the type last mentioned (commonly known as turbojet engines) are widely used to propel aircraft. In this application, particularly in supersonic aircraft, it is important that the engines be operated as efficiently as possible, both in commercial aircraft for reasons of economy and in military aircraft to produce maximum performance.

As mentioned above, it is important in obtaining maximum operating efficiencies to maintain the gas inlet temperatures to turbine 30 as high as possible. On the other hand, the maximum established service temperature of the turbine buckets 34 cannot be exceeded as this will result in rapid deterioration of the buckets. It is the function of temperature measuring apparatus 22 to provide an accurate measure of bucket temperature so that these components may be maintained at a temperature which is close to but does not exceed the maximum allowable service temperature.

Figure 2:
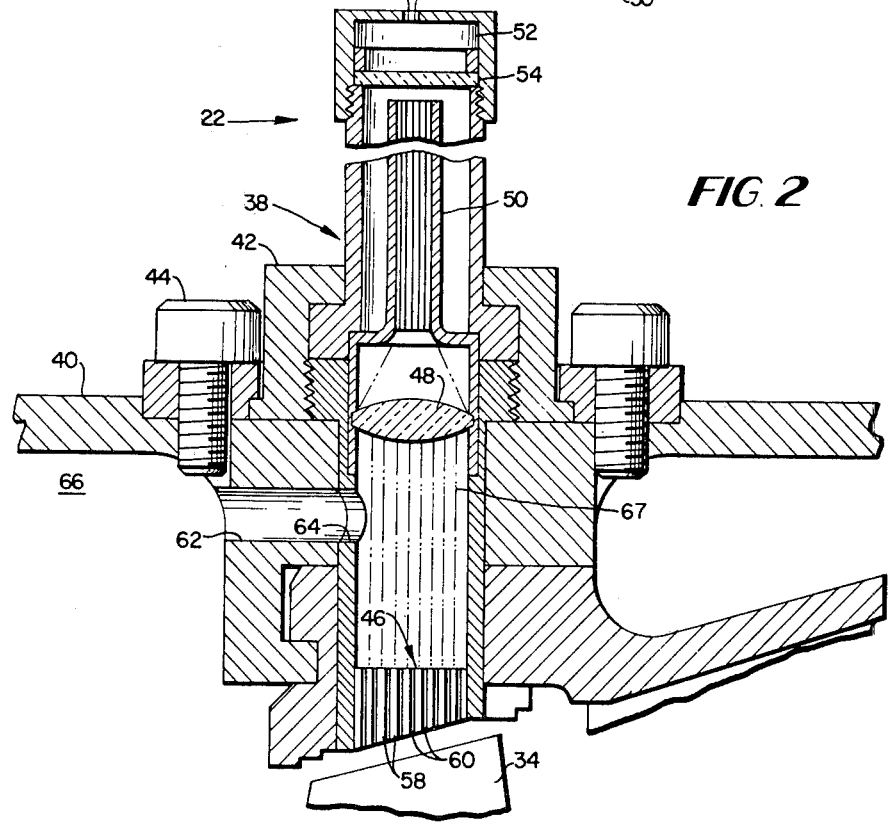
FIG. 2 is a section through the temperature measuring apparatus of FIG. 1.

As best shown in FIG. 2, temperature measuring apparatus 22 includes a casing 38 removably fixed to the housing 40 of turbine engine 20 as by collar 42 and cap screws 44. The major components of the temperature measuring apparatus, all housed in casing 38, are a gas collimator or interface device 46, an objective lens 48, a fiber optics device 50, a silicon diode type photovoltaic detector 52, and an optical filter 54 ("Fiber optics device" is intended to be used in a generic sense herein to include both devices comprised of a bundle of fibers as shown in FIG. 2 and those employing a single radiant energy transmitting member such as the typical sapphire or quartz light pipe as well as equivalent devices). The radiation emitted from the heated target area at the turbine bucket passes through interface device 46 to lens 48, which is employed to provide a seal against the entry of foreign matter and to focus radiant energy transmitted by it onto the end of fiber optics device 50. The fiber optics device conducts the radiant energy through filter 54 to detector 52, causing the detector to generate an electrical signal having a magnitude proportional to the intensity of the radiant energy falling upon it and, accordingly, proportional to the brightness temperature of the turbine buckets.

The use of the fiber optics device, while not mandatory in all applications, will typically prove to be beneficial since it can be employed to conduct the radiant energy without significant loss to a location 6 or 12 inches or more away from collimator 46. This permits detector 52, which is typically formed of a material having comparatively low heat resistance, to be located far enough from the collimator and the heated components being monitored to prevent overheating and thereby prolong the life of the pyrometer as well as simplifying its maintenance.

This signal may be employed to regulate the flow of fuel to turbine engine 20 and/or digitized to provide a visual reading of the bucket temperature. The signal generated by detector 52 may be so processed as to provide readings of individual bucket temperatures, an average of the temperature of specified groups of turbine buckets, or an averaged reading of all the buckets as will become apparent hereinafter.

Collimator 46 includes a plurality of open-ended capillary tubes 58 of a reflective, heat resistant material (Collimators of the type illustrated in FIG. 2 are disclosed in more detail in U.S. Pat. No. 3,584,509). The collimator is mounted in casing 38 in any convenient fashion and typically has its end 60 nearest the object or components being monitored (in this case turbine buckets 34) so configured as to be generally parallel to the target portion of the monitored body or components.

As shown in FIGS. 1 and 2, communicating apertures 62 and 64 are formed in gas turbine engine housing 40 and in temperature measuring apparatus casing 38, respectively. These communicating apertures permit clean, uncontaminated, compressed air to flow from chamber 66 in gas turbine engine 20 into chamber 67 in casing 38 and through the tubes 58 of collimator 46. This air, cools and prevents overheating of the optical temperature measuring components of apparatus 22 and, even more importantly, prevents soot and other foreign material from collecting on the collimator or objective lens 48 and absorbing radiant energy emitted from turbine buckets 34. This is important because the output signal generated by detector 52 and, accordingly, the temperature signal into which the output is converted, is proportional to the intensity of the radiant energy incident on the detector. Accordingly, if part of this energy is absorbed before it reaches the detector, the latter will generate a signal which, when converted, will indicate that the temperature of the component or components being monitored is lower than the actual temperature.

As in the case of collimator 46, lens 48, fiber optics device 50, and detector 52, the purposes for which they are employed, etc. are described in detail in U.S. Pat. No. 3,584,509. These components will accordingly not be described further herein.

The magnitude of the signal produced by a silicon type photovoltaic detector is proportional to the ambient temperature of the environment in which the detector is located. Accordingly, compensation must be provided for changes in the magnitude of the detector output signal attributable to changes in the ambient temperature rather than the intensity of the radiant energy emitted from the object being monitored and falling on the detector. In the embodiment of the present invention shown in FIG. 2, this is automatically accomplished by filter 54.

More specifically, as the temperature of the preferred type of detector 52 increases, its sensitivity to energy of longer wavelengths (typically greater than 1 micron) also increases. This causes an increase in the detector output and therefore the indicated temperature even though the temperature of the monitored component or components and thus the intensity of the radiant energy impinging on the detector remains constant. It is the function of filter 54 to keep the longer wavelength energy emitted from the component or components subjected to temperature measurement from impinging on the detector. The filter, which may be a conventional optical filter, accomplishes this by cutting off and not transmitting energy of a wavelength longer than that which it is desired to have reach the detector (again typically on the order of 1 micron). Accordingly, only the shorter wavelength energy reaches the detector. As the response curve of the silicon type detector is relatively insensitive to energy of this character, the detector output consequently becomes independent of the detector temperature and accurately reflects the actual temperature of the target area even though this temperature changes.

Referring now to FIG. 3, the photovoltaic detector 52 of temperature measuring apparatus 22 is connected to a load device which, as discussed above, will typically be analog amplifier 24. A calibration resistor 68 is normally connected in parallel between the detector and load device to reduce the voltage drop across the load device and thereby facilitate the handling of the detector generated signal.

The amplified signal can be employed to modulate the flow of fuel to turbine engine combustion section 26 and thereby maintain the turbine bucket temperature at a level which will produce maximum efficiency and/or constant power output and other desirable operating characteristics.

Also, the signal can be fed through a digitizing section 70 consisting of analog-to-digital and binary-to-decimal converters of conventional construction and then into a conventional register 72 to provide a digital display of the temperature of the body being monitored. Also, by connecting a conventional synchronizing programmer 74 between the amplifier and digitizing sections, the amplified signal can be picked off at intervals so selected that the temperature which is displayed on register 72 will be that of a specific bucket 34, the average temperature of a selected group of buckets, or the average of all the buckets in wheel 32.

Numerous modifications may of course be made in the embodiment of the invention just described without exceeding its scope. A number of such modifications are described in above-incorporated U.S. Pat. No. 3,584,509.

In the embodiments of the invention to hereinafter be described, the components are in some instances the same as those described above in conjunction with the embodiment of FIGS. 1-3. To the extent that this is true, the same reference characters have been employed to identify like components.

Figure 4:
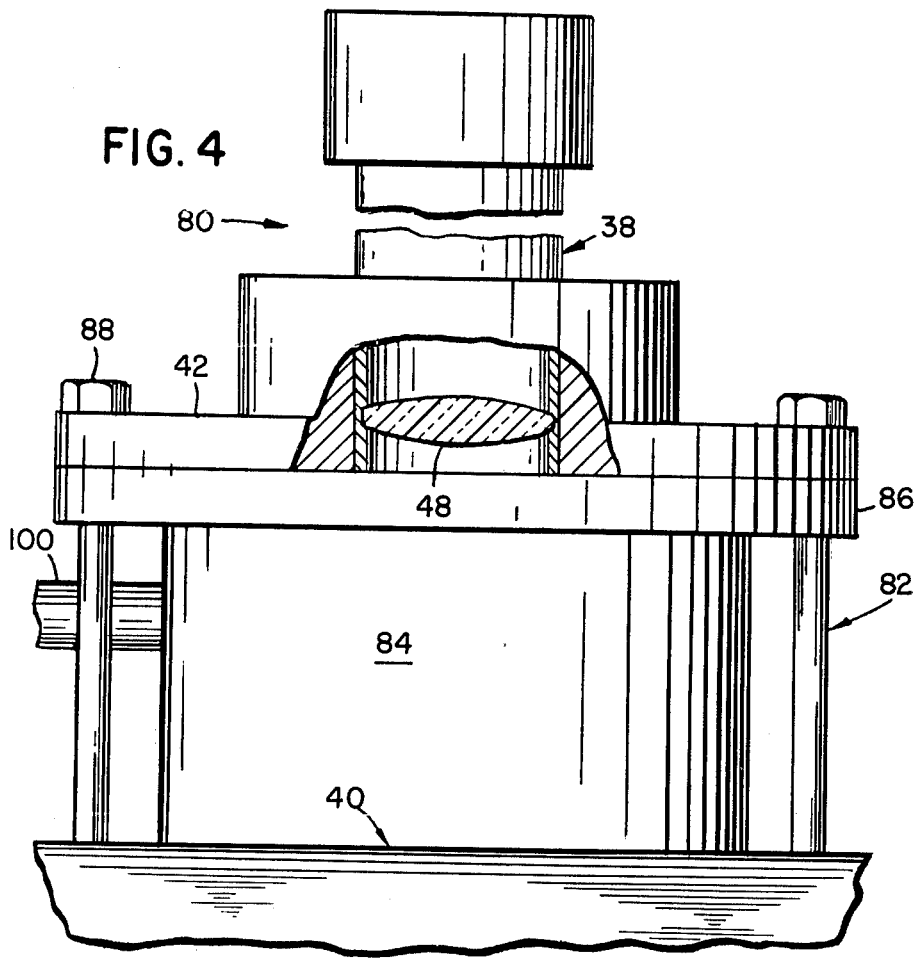
FIG. 4 is a side view of a second form of temperature measuring apparatus constructed in accord with the principles of the invention.
Figure 5:
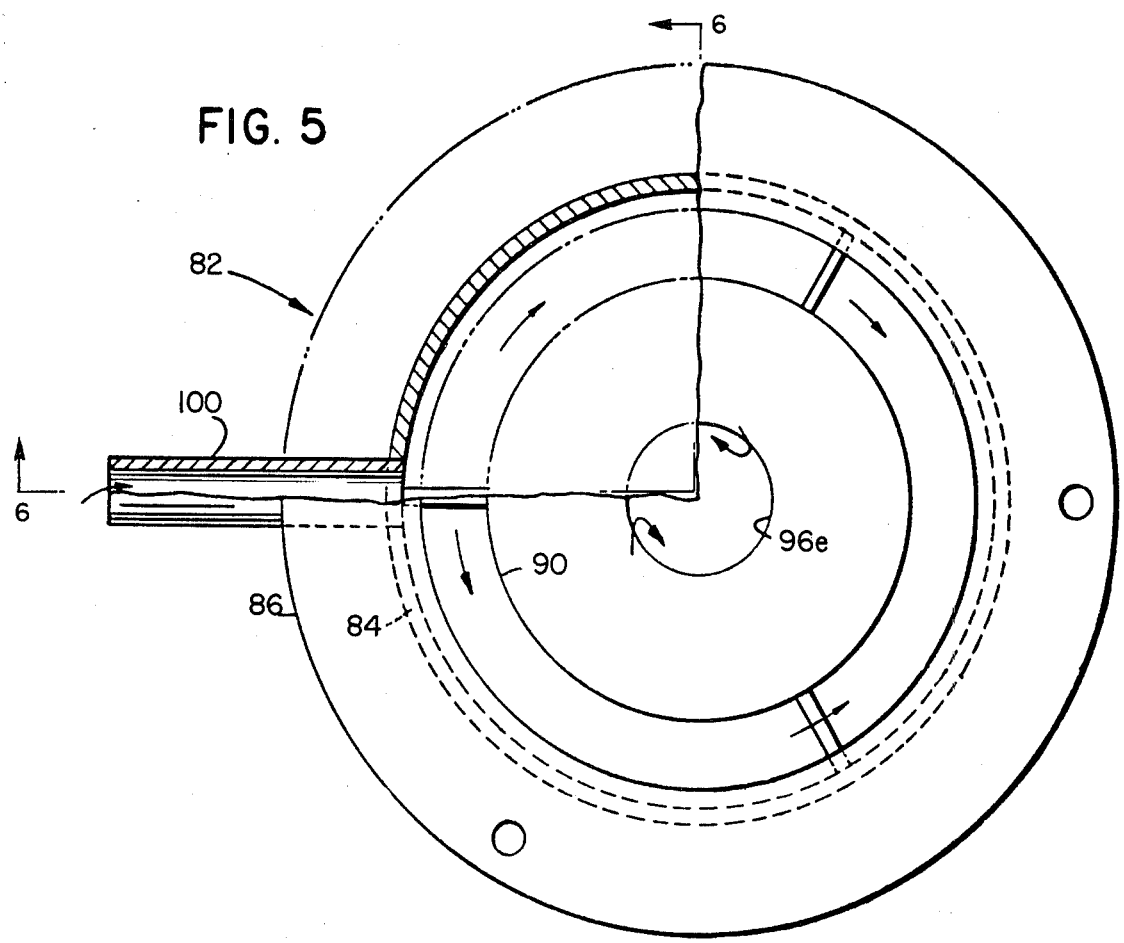
FIG. 5 is a plan view, partly in section, of an interface device employed in the temperature measuring apparatus of FIG. 4.
Figure 6:
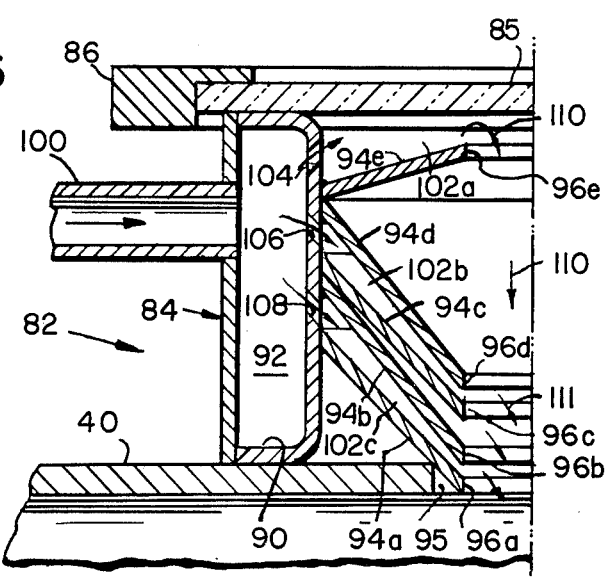
FIG. 6 is a section through the interface device, taken substantially along line 6—6 of FIG. 5.

Referring again to the drawing, FIGS. 4-6 depict temperature measuring apparatus 80 employing an alternate form of interface device 82, which may be used in lieu of the collimator 46 described above.

As best shown in FIGS. 5 and 6, collimator 82 includes a cylindrical casing 84 having an open outer end to which an interface window 85 formed of a heat resistant, light transmitting material is fixed as by annular ring 86. The casing, window, and attachment ring are maintained in assembled relationship and the assembly fixed to turbine engine housing 40 as by elongated fasteners 88 which extend through collar 42 and attachment ring 86 and are threaded into the turbine engine housing.

Supported within and fixed to casing 84 in any convenient fashion is a spool-like inner member 90 which cooperates with casing 84 to provide an annular plenum 92. Plenum-forming member 90 supports a series (five in the illustrated embodiment) of frustoconical flow directing or deflecting members or baffles 94 a-e having central apertures 96 a-e. Baffle 94 a extends through an opening 95 in turbine engine housing 40 providing communication between the interior of the engine and the interior of interface device 82.

In this embodiment of the invention, radiant energy emitted from the target area of the turbine bucket or other component or components subjected to temperature measurement (not shown) passes seriatim through apertures 96 a-e and interface window 85 to objective lens 48. Then, as in the embodiment of FIGS. 1-3, the radiant energy is conducted through a fiber optics device and, preferably, an optical filter to a photovoltaic detector to produce an output signal which can be converted to one indicative of the temperature of the component or components subjected to temperature measurement. Aside from lens 48, these components have not been shown as they may be identical to the corresponding components of temperature measuring apparatus 22.

Purge air is supplied to the plenum 92 between interface device components 90 and 84 through a supply tube 100 from an appropriate source (not shown) such as the compressor section of the engine. As best shown in FIG. 6, annular member 94 e cooperates with interface window 85 to form a first nozzle 102 a while annular members 94 d and 94 c cooperate to form a second nozzle 102 b and annular member 94 a and 94 b cooperate to form a third annular nozzle 102 c. Purge air flows from plenum 92 through openings 104, 106, and 108 formed in inner member 90 at intervals therearound (only one nozzle in each series is shown) into nozzles 102 a-c. The air exiting from nozzle 102 a flows across the surface of interface window 85 to keep foreign matter from being deposited on it and then toward the interior of the turbine engine as shown by arrows 110 in FIG. 6. This air is entrained in that exiting from nozzles 102 b and 102 c and carried with the latter through the central openings 96 b-d in the nozzle forming members into the interior of the turbine as shown by arrows 111. Thus, as in the case of the collimator described above, the purge air keeps foreign matter from being deposited on the components providing the interface with the turbine and thereby attenuating the signal emanating from the component or components subjected to temperature measurement.

From the foregoing, it will be apparent to those skilled in the relevant arts that numerous modifications may be made in the exemplary embodiments of the invention described above without exceeding its scope. To the extent that these modifications are not expressly disclaimed in the appended claims, they are fully intended to be covered therein.

Furthermore, it will be apparent to such persons that the novel temperature measuring apparatus described herein may be employed in applications other than that discussed above. Such additional applications of the principles of the invention are also fully intended to be covered in the appended claims to the extent that they are not expressly excluded therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. Temperature measuring apparatus comprising detector means for generating an electrical signal having a magnitude proportional to the intensity of radiant energy impinging thereon; means for conducting radiant energy from a body subjected to temperature measurement to said detector means including an optical component adapted to lie in the optical path between said body and said detector means, said component being capable of transmitting radiant energy impinging thereon; and means adapted to be interposed between the optical component and the body subjected to temperature measurement for keeping foreign material from collecting on said component, said last-mentioned means comprising a housing surrounding said optical component; interface means in said housing adjacent said optical component for keeping foreign material from reaching said component; means in said housing on the opposite side of said last-mentioned means from said optical component providing an annular plenum; means providing an inlet to said housing and to said plenum; means providing outlets through which fluid can flow from said plenum into said housing; a first baffle means in said housing for directing fluid exiting through said outlets across said interface means to keep foreign material from collecting thereon, said first baffle means having an aperture through which radiant energy can pass to said interface means; means providing a fluid outlet from said housing along the optical path through which energy emitted from the body subjected to temperature measurement can pass; and a second baffle means in said housing for directing fluid exiting from said plenum first into entraining relationship with the fluid directed across said interface means and then through the outlet from the housing, said second baffle means also being apertured so that radiant energy can pass therethrough to said interface means.

2. Temperature measuring apparatus comprising detector means for generating an electrical signal having a magnitude proportional to the intensity of radiant energy impinging thereon, means for conducting radiant energy from a body subjected to temperature measurement to said detector means, and filter means in the optical path between said body and said detector means for keeping from said detector means energy having wavelengths longer than a specified maximum wavelength and thereby making said apparatus insensitive to changes in the temperature of the detector means, the means for conducting radiant energy to the detector means including a fiber optics device having one end adjacent said detector means and a lens in the optical path between the body subjected to temperature measurement and the fiber optics device for focusing radiant energy emitted from said body onto the outer end of the fiber optics device, said apparatus further including means adapted to be between the lens and the body subjected to temperature measurement for keeping foreign material from collecting on said lens which comprises a housing surrounding said lens; an interface window in said housing adjacent said lens for keeping foreign material from reaching said lens; means in said housing on the opposite side of said window from said lens providing an annular plenum; means providing an inlet to said housing and to said plenum; means providing outlets through which fluid can flow from said plenum into said housing; a first baffle means in said housing for directing fluid exiting through said outlets across said interface window to keep foreign material from collecting thereon, said first baffle means having an aperture through which radiant energy can pass to said window; means providing a fluid outlet from said housing along the optical path through which energy emitted from the body subjected to temperature measurement can pass; and a second baffle means in said housing for directing fluid exiting from said plenum first into entraining relationship with the fluid directed across said interface window and then through the outlet from the housing, said second baffle means also being apertured so that radiant energy can pass therethrough to said interface window.

* * * * *